US012608684B2

(12) United States Patent
Chen et al.

(10) Patent No.: US 12,608,684 B2
(45) Date of Patent: Apr. 21, 2026

(54) OPERATION METHOD AND OPERATION DEVICE FOR REAL-TIME DISCUSSION WINDOW

(71) Applicant: United Microelectronics Corp., Hsinchu (TW)

(72) Inventors: Hsin-Yu Chen, Tainan City (TW); Ching-Pei Lin, Hsinchu County (TW); Ming-Wei Chen, Tainan City (TW); Chuan-Guei Wang, Yunlin County (TW); Yi-Lin Hung, Tainan City (TW); Chung-Pen Hsu, Tainan City (TW)

(73) Assignee: UNITED MICROELECTRONICS CORP., Hsinchu (TW)

( * ) Notice: Subject to any disclaimer, the term of this patent is extended or adjusted under 35 U.S.C. 154(b) by 104 days.

(21) Appl. No.: 18/404,940

(22) Filed: Jan. 5, 2024

(65) Prior Publication Data

US 2025/0190950 A1     Jun. 12, 2025

(30) Foreign Application Priority Data

Dec. 7, 2023    (TW) ................................. 112147657

(51) Int. Cl.
*G06Q 10/1093*      (2023.01)
*G06N 3/0895*      (2023.01)
(52) U.S. Cl.
CPC ....... *G06Q 10/1093* (2013.01); *G06N 3/0895* (2023.01)
(58) Field of Classification Search
CPC ........... G06N 3/00–20/00; G06Q 10/00–50/00

USPC ................................................ 705/7.11–7.42
See application file for complete search history.

(56) References Cited

U.S. PATENT DOCUMENTS

| | | | | |
|---|---|---|---|---|
| 6,064,978 A * | 5/2000 | Gardner | ............. | G06Q 30/0203 |
| | | | | 706/45 |
| 11,646,013 B2 * | 5/2023 | Tran | .................... | G10L 15/1822 |
| | | | | 704/232 |
| 11,824,820 B1 * | 11/2023 | Matthews | ............ | G06Q 30/016 |
| 11,949,638 B1 * | 4/2024 | Rosenberg | ............ | H04L 51/046 |
| 12,190,294 B2 * | 1/2025 | Rosenberg | .............. | H04L 51/04 |
| 2004/0044542 A1 * | 3/2004 | Beniaminy | ............ | G06N 5/022 |
| | | | | 706/45 |
| 2009/0245500 A1 * | 10/2009 | Wampler | .............. | H04M 7/006 |
| | | | | 379/265.09 |
| 2012/0042263 A1 * | 2/2012 | Rapaport | ............... | G06Q 10/40 |
| | | | | 709/204 |

(Continued)

*Primary Examiner* — Alan S Miller
(74) *Attorney, Agent, or Firm* — WPAT, PC

(57) ABSTRACT

An operation method and an operation device for operating a real-time discussion window are provided. The operation method for operating the real-time discussion window includes the following steps. A discussion topic is obtained from an initiator. A participant candidate list is provided. The participant candidate list includes a plurality of non-player characters. A participant suggestion list is provided from the candidate list according to the discussion topic. At least one of the non-player characters is added into the real-time discussion window according to a selection result of the initiator. At least one relevant technical person is invited into the real-time discussion window. The discussion topic is discussed in the real-time discussion window. A discussion report is automatically generated according to the discussion content in the real-time discussion window.

12 Claims, 7 Drawing Sheets

(56) References Cited

U.S. PATENT DOCUMENTS

| | | | |
|---|---|---|---|
| 2014/0129651 A1* | 5/2014 | Gelfenbeyn | H04L 51/52 |
| | | | 709/206 |
| 2015/0339020 A1* | 11/2015 | D'Amore | H04L 67/104 |
| | | | 715/753 |
| 2015/0347900 A1* | 12/2015 | Bell | G06N 5/02 |
| | | | 706/11 |
| 2017/0048170 A1* | 2/2017 | Smullen | H04L 67/02 |
| 2017/0324867 A1* | 11/2017 | Tamblyn | H04L 65/1093 |
| 2018/0196796 A1* | 7/2018 | Wu | G06F 40/289 |
| 2018/0218252 A1* | 8/2018 | Wu | G06N 3/006 |
| 2018/0232741 A1* | 8/2018 | Jadhav | G06Q 30/016 |
| 2019/0007228 A1* | 1/2019 | Vuskovic | G06Q 10/00 |
| 2019/0251959 A1* | 8/2019 | Engles | H04M 3/527 |
| 2020/0387550 A1* | 12/2020 | Cappetta | G06F 16/9538 |
| 2023/0419270 A1* | 12/2023 | Li | H04L 65/403 |
| 2024/0394285 A1* | 11/2024 | Cunningham | G06F 40/30 |
| 2025/0060930 A1* | 2/2025 | Berglund | G06Q 10/10 |

* cited by examiner

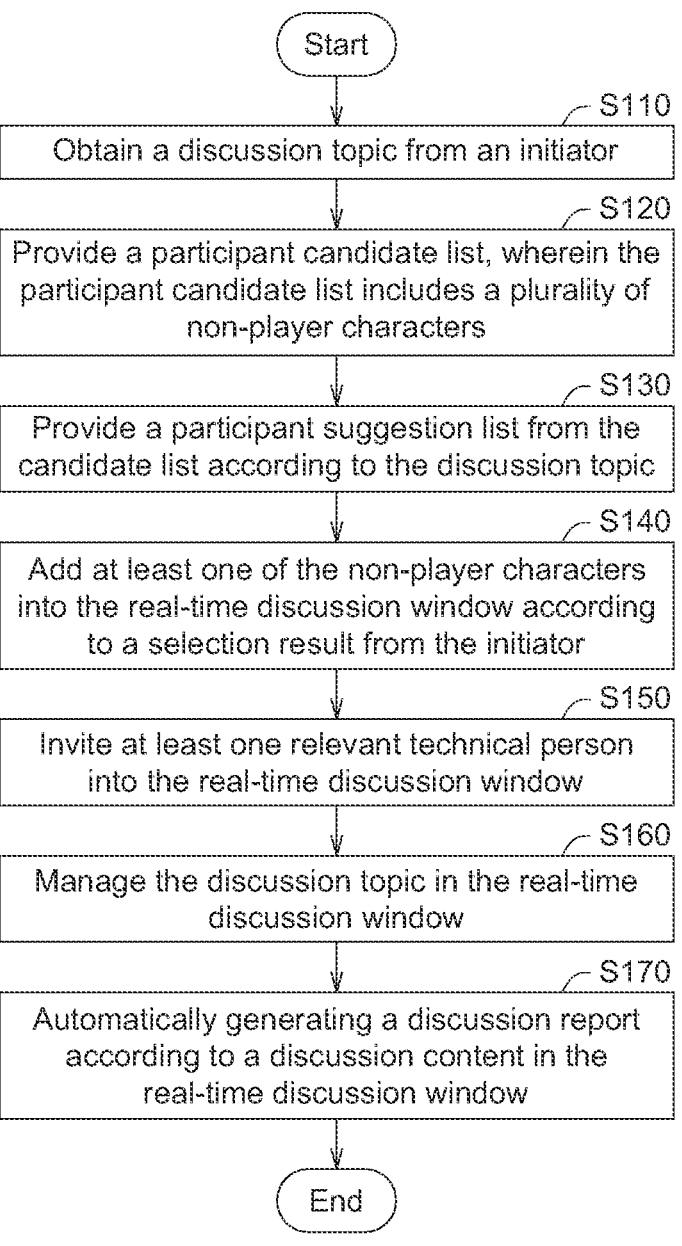

Start

S110

Obtain a discussion topic from an initiator

S120

Provide a participant candidate list, wherein the participant candidate list includes a plurality of non-player characters

S130

Provide a participant suggestion list from the candidate list according to the discussion topic

S140

Add at least one of the non-player characters into the real-time discussion window according to a selection result from the initiator

S150

Invite at least one relevant technical person into the real-time discussion window

S160

Manage the discussion topic in the real-time discussion window

S170

Automatically generating a discussion report according to a discussion content in the real-time discussion window End

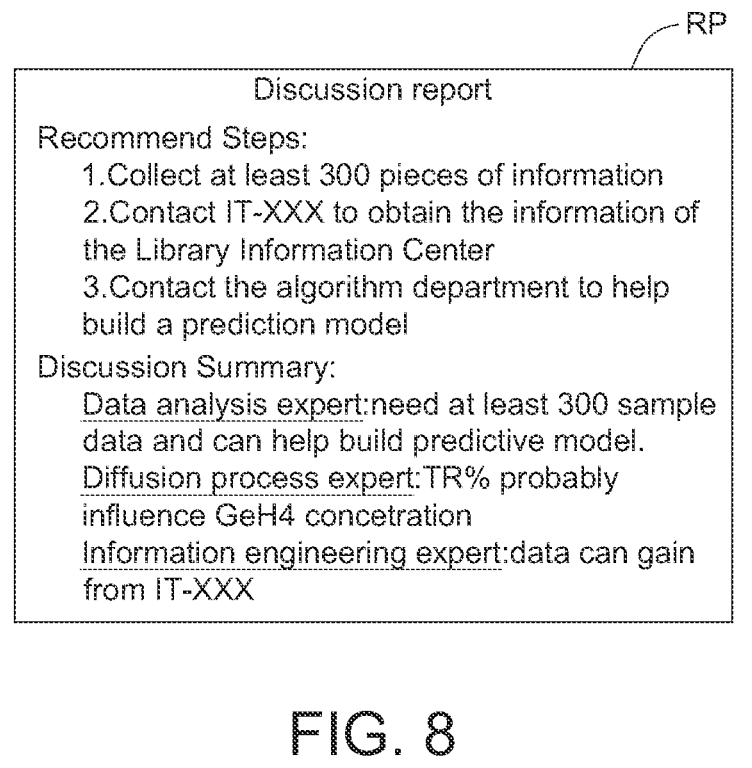

Discussion report

Recommend Steps:
 1.Collect at least 300 pieces of information
 2.Contact IT-XXX to obtain the information of
 the Library Information Center
 3.Contact the algorithm department to help
 build a prediction model Discussion Summary:
 Data analysis expert:need at least 300 sample
 data and can help build predictive model.
 Diffusion process expert:TR% probably
 influence GeH4 concetration
 Information engineering expert:data can gain
 from IT-XXX

FIG. 8

OPERATION METHOD AND OPERATION DEVICE FOR REAL-TIME DISCUSSION WINDOW

This application claims the benefit of Taiwan application Serial No. 112147657, filed Dec. 7, 2023, the disclosure of which is incorporated by reference herein in its entirety.

TECHNICAL FIELD

The disclosure relates in general to an operation method and an operation device, and more particularly to an operation method and an operation device for a real-time discussion window.

BACKGROUND

Traditionally, when faced with an issue that needs to be discussed, a discussion meeting with a particular must be organized across departments. As long as any relevant person does not have free time, the discussion of the issue will be delayed, and no effective solution can be obtained.

In addition, after the discussion meeting, the content discussed in the meeting also needs to be recorded and organized manually to obtain a complete discussion record, which consumes a lot of time in making meeting reports.

SUMMARY

The disclosure is directed to an operation method and an operation device for a real-time discussion window. The artificial intelligence technology is used to create some non-player characters, so that when the initiator encounters a certain issue, he could instantly create a discussion window to discuss with the non-player characters to immediately solve the current issue and automatically obtain a summary report.

According to one embodiment, an operation method for a real-time discussion window is provided. The operation method for the real-time discussion window includes the following steps: obtaining a discussion topic from an initiator; providing a participant candidate list, wherein the participant candidate list includes a plurality of non-player characters; providing a participant suggestion list from the participant candidate list according to the discussion topic; adding at least one of the non-player characters into the real-time discussion window according to a selection result from the initiator; inviting at least one relevant technical person into the real-time discussion window; managing the discussion topic in the real-time discussion window; and automatically generating a discussion report according to a discussion content in the real-time discussion window.

According to an alternative embodiment, an operation device for a real-time discussion window is provided. The operation device for the real-time discussion window includes a receiving unit, a list generating unit, a recommending unit, a joining unit, a matching unit, a window management unit and a report generating unit. The receiving unit is configured to obtain a discussion topic from an initiator. The list generating unit is configured to provide a participant candidate list. The participant candidate list includes a plurality of non-player characters. The recommending unit is configured to provide a participant suggestion list from the participant candidate list according to the discussion topic. The joining unit is configured to add at least one of the non-player characters into the real-time discussion window according to a selection result from the initiator. The matching unit is configured to invite at least one relevant technical person into the real-time discussion window. The window management unit is configured to manage the discussion topic in the real-time discussion window. The report generating unit is configured to automatically generate a discussion report according to a discussion content in the real-time discussion window.

BRIEF DESCRIPTION OF THE DRAWINGS

FIG. 3 illustrates a flow chart of an operation method for the real-time discussion window according to an embodiment of the present disclosure.

FIG. 8 illustrates an example of the discussion report according to an embodiment of the present disclosure.

Figure 1:
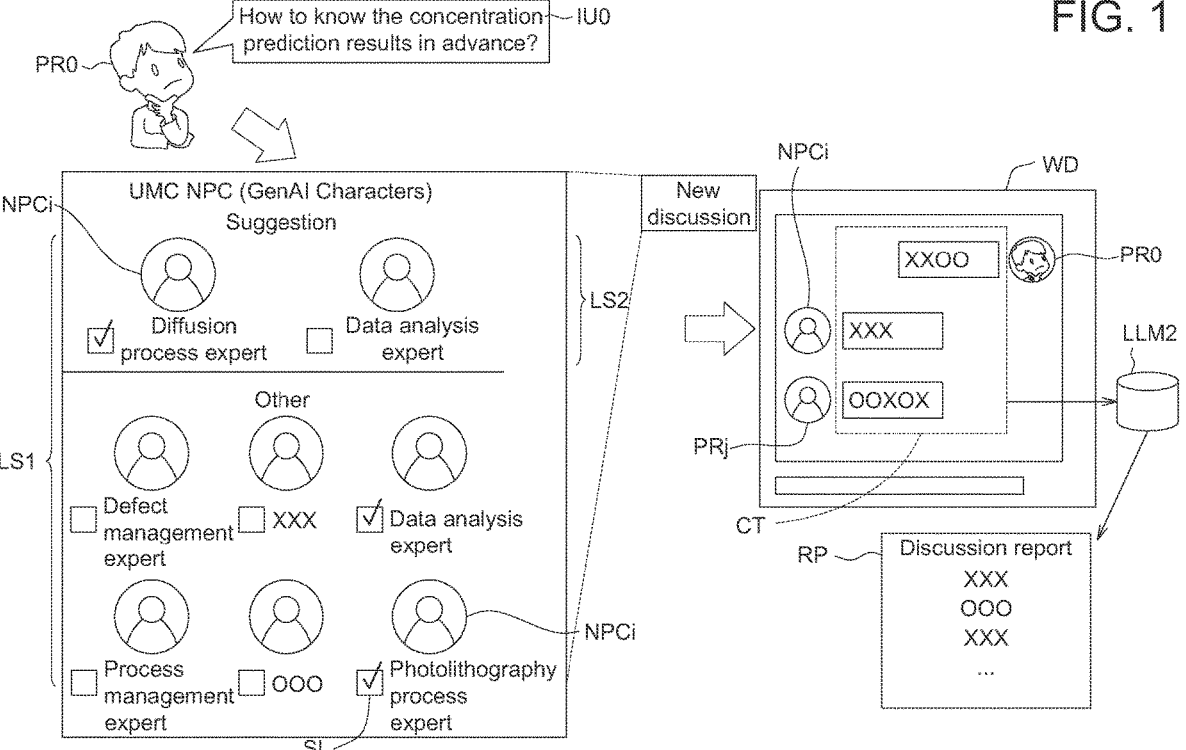
FIG. 1 illustrates an operation process of a real-time discussion window according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The technical terms used in this specification refer to the idioms in this technical field. If there are explanations or definitions for some terms in this specification, the explanation or definition of this part of the terms shall prevail. Each embodiment of the present disclosure has one or more technical features. To the extent possible, a person with ordinary skill in the art may selectively implement some or all of the technical features in any embodiment, or selectively combine some or all of the technical features in these embodiments.

FIG. 1 illustrates an operation process of a real-time discussion window WD according to an embodiment of the present disclosure. When an initiator PR0 proposes a discussion topic IU0, a real-time discussion window WD could be instantly established. Some non-player characters NPCi and/or some cross-department relevant technical persons PRj could be jointed in the same real-time discussion window WD to discuss together. After the meeting, a discussion report RP can be automatically generated according to on the discussion content CT to implement suggestions.

Figure 2:
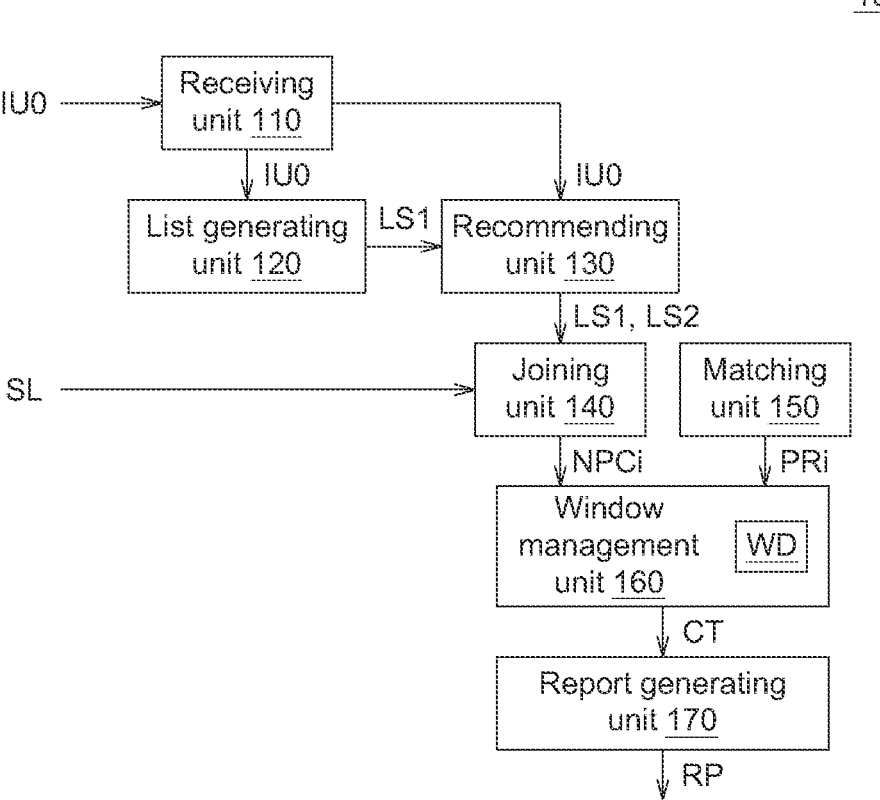
FIG. 2 illustrates a block diagram of an operation device for the real-time discussion window according to an embodiment of the present disclosure.

FIG. 2 illustrates a block diagram of an operation device 100 for the real-time discussion window WD according to an embodiment of the present disclosure. The operation device for the real-time discussion window WD 100 includes a receiving unit 110, a list generating unit 120, a recommending unit 130, a joining unit 140, a matching unit 150, a window management unit 160 and a report generating unit 170.

The receiving unit 110 is used to receive data, such as a keyboard, a transmission device, a voice input device or a screen capture device.

The list generating unit 120, the recommending unit 130, the joining unit 140, the matching unit 150, the window management unit 160 are the report generating unit 170 are used to execute various computing processing programs, such as a circuit, a circuit board, a storage device for storing program codes or a chip. The chip is, for example, a central processing unit (CPU), or other programmable general-purpose or special-purpose micro control unit (MCU), microprocessor, digital signal processor (DSP), programmable controller, application specific integrated circuit (ASIC), graphics processing unit (GPU), image signal processor (ISP), image processing unit (IPU), arithmetic logic unit (ALU), complex programmable logic device (CPLD), field programmable gate array (FPGA) or other similar elements or the combination thereof.

In this embodiment, the operation device 100 of the real-time discussion window WD uses the artificial intelligence technology to establish the non-player characters NPCi, so that when the initiator PR0 needs to discuss the discussion topic IU0, it can instantly establish the real-time discussion window WD and communicate with it. As such, the current discussion topic IU0 can be solved immediately, and the discussion report RP can be automatically obtained after the discussion meeting. The following is a flow chart to explain the operation of each component in detail.

FIG. 3 illustrates a flow chart of an operation method for the real-time discussion window WD according to an embodiment of the present disclosure. The operation method of the real-time discussion window WD includes steps S110 to S170. As shown in FIGS. 1 and 2, in the step S110, the receiving unit 110 obtains the discussion topic IU0 from the initiator PR0.

Figure 4:
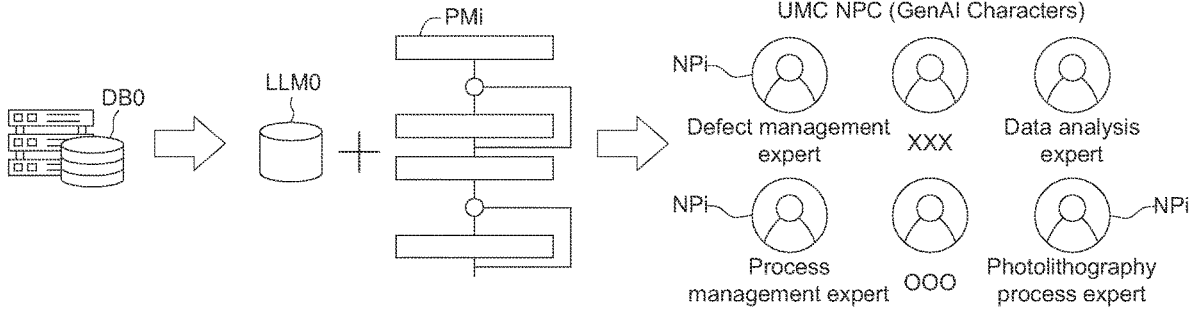
FIG. 4 illustrates a method of establishing a plurality of non-player characters according to an embodiment of the present disclosure.

In the step S120, as shown in FIGS. 1 and 2, the list generating unit 120 provides a participant candidate list LS1. The participant candidate list LS1 includes the plurality of non-player characters NPCi. Please refer to FIG. 4, which illustrates a method of establishing the non-player characters NPCi according to an embodiment of the present disclosure. Each of the non-player characters NPCi is trained via a large language model (LLM) LLM0. In this embodiment, the large language model LLM0 is further trained and adjusted to obtain one of the non-player characters NPCi. For example, the large language model LLM0 could be trained with different fine-tuning parameters PMi based on a production data database DB0 to obtain the different non-player characters NPCi. The large language model LLM0 is, for example, Generative Pre-trained Transformer 4 (GPT-4), Chat Generative Pre-trained Transformer (Chat GPT), Large Language Model Meta AI (LLAMA2), Claude Model or BigScience Large Open-science Open-access Multilingual Language Model (BLOOM).

Based on the same production data database DB0, several fine-tuning parameters PMi could be inputted to the large language model LLM0 for training according to the professional categories of different non-player characters NPCi, so as to train these non-player characters NPCi for different categories.

Next, in the step S130, as shown in FIGS. 1 and 2. The recommending unit 130 provides a participant suggestion list LS2 from the participant candidate list LS1 according to the discussion topic IU0. As shown in FIG. 1, the initiator PR0 could select the non-player characters NPCi in the participant suggestion list LS2 that initiator PR0. Alternatively, the initiator PR0 could select the non-player character NPCi that is not included in the participant suggestion list LS2.

Figure 5:
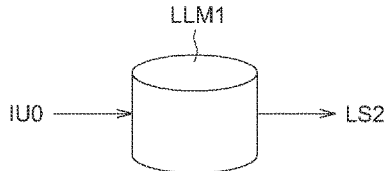
FIG. 5 illustrates an example of the process for providing a participant suggestion list according to an embodiment of the present disclosure.

Please refer to FIG. 5, which illustrates an example of the process for providing the participant suggestion list LS2 according to an embodiment of the present disclosure. The recommending unit 130 uses a recommended model LLM1 to recommend the participant suggestion list LS2 from the participant candidate list LS1 according to the discussion topic IU0. The recommended Model LLM1 will provide a list of the non-player characters NPCi for the initiator PR0 to select according to the discussion topic IU0.

In the step S140, as shown in FIGS. 1 and 2, the joining unit 140 adds at least one of the non-player characters NPCi from the participant candidate list LS1 to the real-time discussion window WD according to a selection result SL from the initiator PR0. The initiator PR0 could select the non-player characters NPCi in the participant suggestion list LS2 to join the real-time discussion window WD. The initiator PR0 could select the non-player characters NPCi which are not in the participant suggestion list LS2 to join the real-time discussion window WD for discussion together.

In the step S150, as shown in FIGS. 1 and 2, the matching unit 150 invites at least one relevant technical person PRj to join the real-time discussion window WD. When the real-time discussion window WD is created, the matching unit 150 will match the relevant technical persons PRj to join the discussion. The matching unit 150 will search for some relevant technical persons PRj suitable for the discussion topic IU0, and match the relevant technical persons PRj who have free time at the moment.

At this time, the matching unit 150 will send a message to ask the initiator PR0 whether to notify the relevant technical person PRj to join the meeting. When the initiator PR0 agrees to notify the relevant technical person PRj, the matching unit 150 will immediately send out an invitation to ask the relevant technical person PRj if he is willing to join the real-time discussion window WD.

Figure 6:
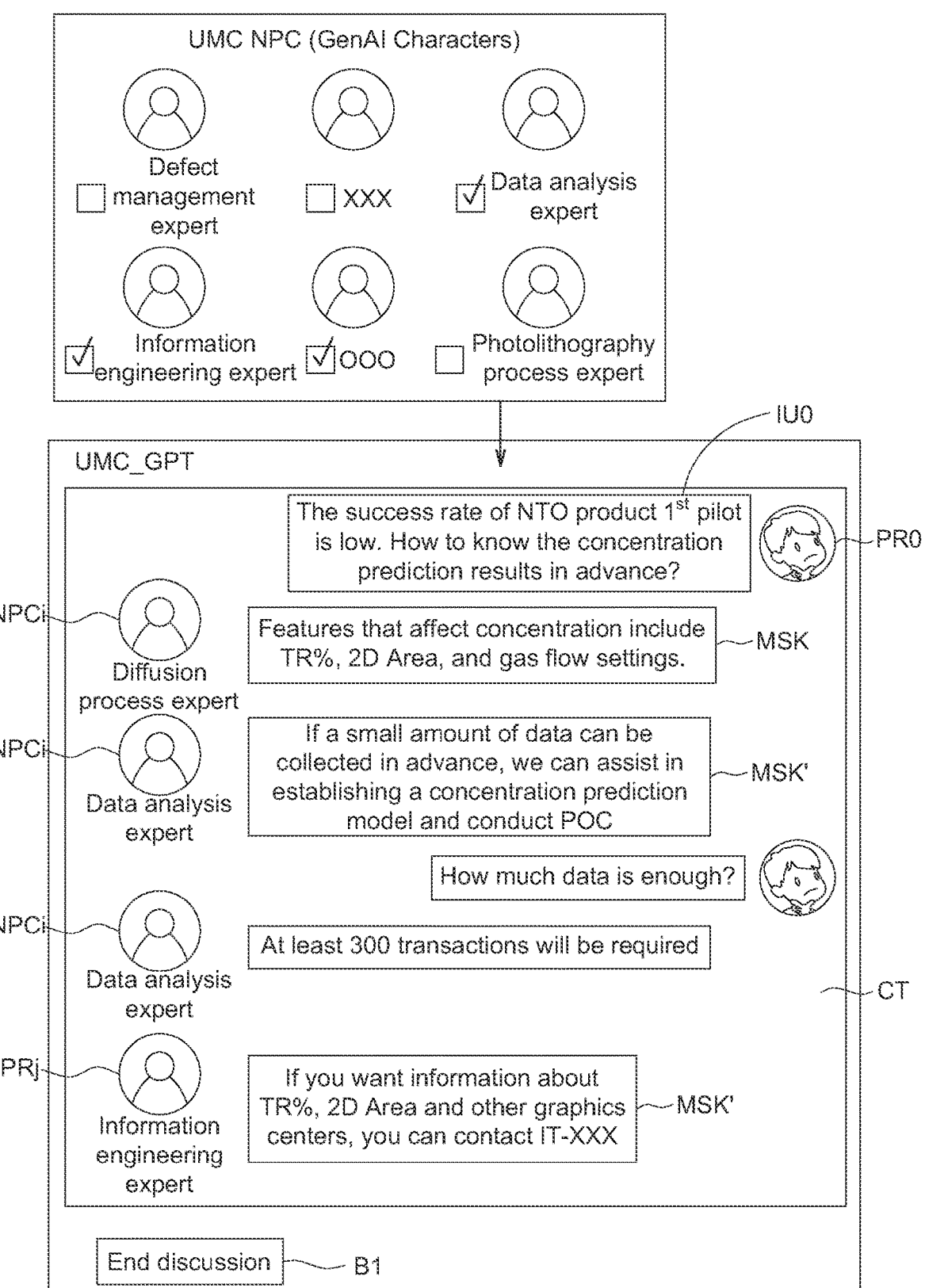
FIG. 6 illustrates an example of the real-time discussion window according to an embodiment of the present disclosure.

In the step S160, as shown in FIGS. 1 and 2, the window management unit 160 manages the discussion in the real-time discussion window WD. Please refer to FIG. 6, which illustrates an example of the real-time discussion window WD according to an embodiment of the present disclosure. After the initiator PR0 proposes the discussion topic IU0 the in real-time discussion window WD, the non-player characters NPCi provide an opinion information MSK' based on the last message MSk in the real-time discussion window WD. The last message MSk could be inputted by the initiator PR0, the relevant technical person PRj or one of the non-player characters NPCi. The relevant technical person PRj is not limited to reply to the last message MSk, and he can submit the opinion information MSK' at any time.

When discussing in the real-time discussion window WD, the content of the last message MSK will be continuously updated. The non-player characters NPCi will continue to provide the opinion information MSK' based on the last message MSk updated in the real-time discussion window WD. At this time, the relevant technical person PRj could also raise the opinion information MSK' at any time during the discussion. When the issue discussion ends, the initiator PR0 clicks the finish button B1 in the real-time discussion window WD to end the discussion.

Figure 7:
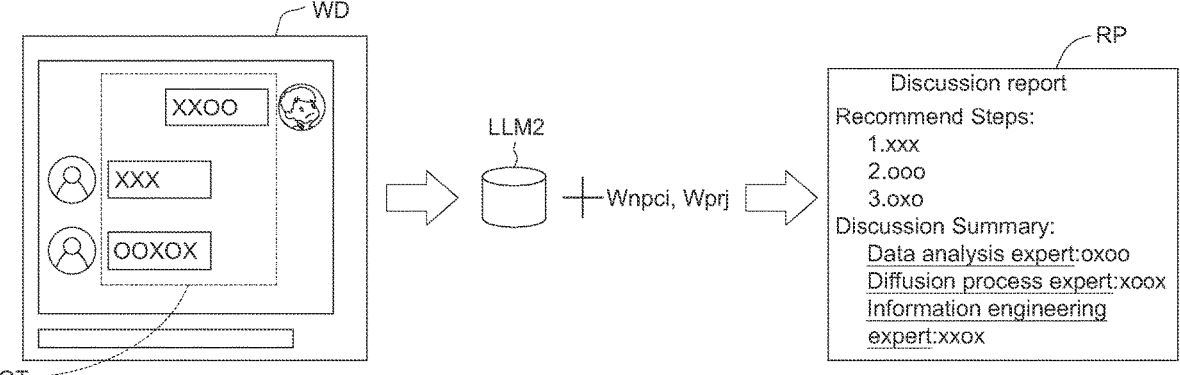
FIG. 7 illustrate an example of generating a discussion report according to the present disclosure.

In the step S170, as shown in FIGS. 1 and 2, the report generating unit 170 automatically generates the discussion report RP according to the discussion content CT of the real-time discussion window WD. Please refer to FIG. 7, which illustrate an example of generating the discussion report according to the present disclosure. The discussion report RP is inferred via a large language model LLM2 according to the discussion content CT. The large language model LLM2 generates the discussion report RP according to the discussion content CT in the real-time discussion window WD, the weighting Wnpci of the non-player character NPCi and the weighting Wprj of the relevant technical person PRj.

In the discussion report RP, the weighting Wprj corresponding to the relevant technical person PRj is higher than the weighting Wnpci corresponding to the non-player character NPCi. Since the relevant technical person PRj is a real engineer in the actual professional field, the proposed opinion information MSk' will be appropriate with the actual usage situation, so the weighting Wprj of the relevant technical person PRj is higher than the weighting Wnpci corresponding to the non-player character NPCi.

Please refer to FIG. 8, which illustrates an example of the discussion report RP according to an embodiment of the present disclosure. The large language model LLM2 lists the suggested steps based on the discussion content CT in the real-time discussion window WD, and integrates the opinion information MSk' provided by each of the non-player characters NPCi and the relevant technical persons PRj to generate the discussion report RP.

According to the above various embodiments, the operation method and the operation device 100 for the real-time discussion window WD of the present disclosure use the artificial intelligence technology to establish the non-player characters NPCi, so that when the initiator PR0 needs to discuss the discussion topic IU0, the real-time discussion window WD would be immediately established, and he could discuss with the non-player characters NPCi and the relevant technical persons PRj to immediately resolve the current discussion topic IU0, and automatically obtain the discussion report RP, eliminating the need to waste manpower and time to prepare discussion report RP after the discussion meeting.

The above disclosure provides various features for implementing some implementations or examples of the present disclosure. Specific examples of components and configurations (such as numerical values or names mentioned) are described above to simplify/illustrate some implementations of the present disclosure. Additionally, some embodiments of the present disclosure may repeat reference symbols and/or letters in various instances. This repetition is for simplicity and clarity and does not inherently indicate a relationship between the various embodiments and/or configurations discussed.

It will be apparent to those skilled in the art that various modifications and variations can be made to the disclosed embodiments. It is intended that the specification and examples be considered as exemplars only, with a true scope of the disclosure being indicated by the following claims and their equivalents.

What is claimed is:

1. An operation method for a real-time discussion window, comprising:

obtaining a discussion topic from an initiator;

providing a participant candidate list, wherein the participant candidate list includes a plurality of non-player characters;

providing a participant suggestion list from the participant candidate list according to the discussion topic;

adding at least one of the non-player characters into the real-time discussion window according to a selection result from the initiator;

inviting at least one relevant technical person into the real-time discussion window;

managing the discussion topic in the real-time discussion window, wherein at least one of the non-player characters provides opinion information according to a last message in the real-time discussion window, and the at least one of the non-player characters continues to provide the opinion information based on the last message until discussion is ended; and automatically generating a discussion report according to a discussion content in the real-time discussion window.

2. The operation method for the real-time discussion window according to claim 1, wherein the participant suggestion list is recommended via a recommended model according to the discussion topic, from the participant candidate list.

3. The operation method for the real-time discussion window according to claim 1, wherein the discussion report is inferred via a large language model according to the discussion content.

4. The operation method for the real-time discussion window according to claim 1, wherein the last message was inputted by the initiator, the relevant technical person or one of the non-player characters.

5. The operation method for the real-time discussion window according to claim 1, wherein the discussion report is generated according to a plurality of weightings of the non-player characters and the relevant technical person.

6. The operation method for the real-time discussion window according to claim 5, wherein the weighting corresponding to the relevant technical person is higher than the weightings corresponding to the non-player characters.

7. An operation device for a real-time discussion window, comprising:

a receiving unit, configured to obtain a discussion topic from an initiator;

a list generating unit, configured to provide a participant candidate list, wherein the participant candidate list includes a plurality of non-player characters;

a recommending unit, configured to provide a participant suggestion list from the participant candidate list according to the discussion topic;

a joining unit, configured to add at least one of the non-player characters into the real-time discussion window according to a selection result from the initiator;

a matching unit, configured to invite at least one relevant technical person into the real-time discussion window;

a window management unit, configured to manage the discussion topic in the real-time discussion window, wherein at least one of the non-player characters provides opinion information according to a last message in the real-time discussion window, and the at least one of the non-player characters continues to provide the opinion information based on the last message until discussion is ended; and a report generating unit, configured to automatically generate a discussion report according to a discussion content in the real-time discussion window.

8. The operation device for the real-time discussion window according to claim 7, wherein the recommending unit recommends the participant suggestion list via a recommended model according to the discussion topic, from the participant candidate list.

9. The operation device for the real-time discussion window according to claim 7, wherein the discussion report is inferred via a large language model according to the discussion content.

10. The operation device for the real-time discussion window according to claim 7, wherein the last message was inputted by the initiator, the relevant technical person or one of the non-player characters.

11. The operation device for the real-time discussion window according to claim 7, wherein the discussion report is generated according to a plurality of weightings of the non-player characters and the relevant technical person.

12. The operation device for the real-time discussion window according to claim 11, wherein the weighting corresponding to the relevant technical person is higher than the weightings corresponding to the non-player characters.

* * * * *